W. C. ZELLE.
TRACTOR.
APPLICATION FILED APR. 1, 1912.
1,130,363.
Patented Mar. 2, 1915.
3 SHEETS—SHEET 1.
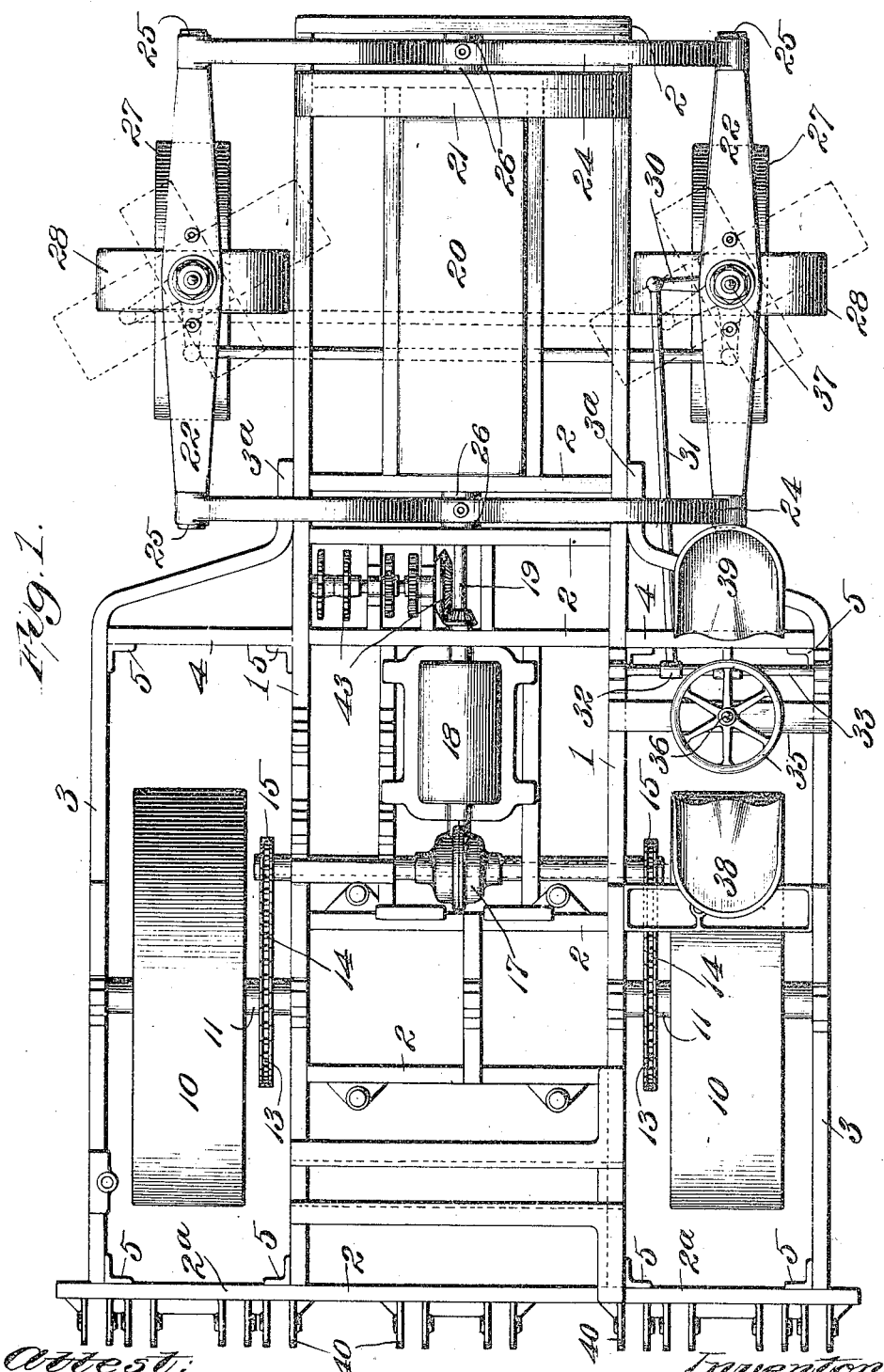

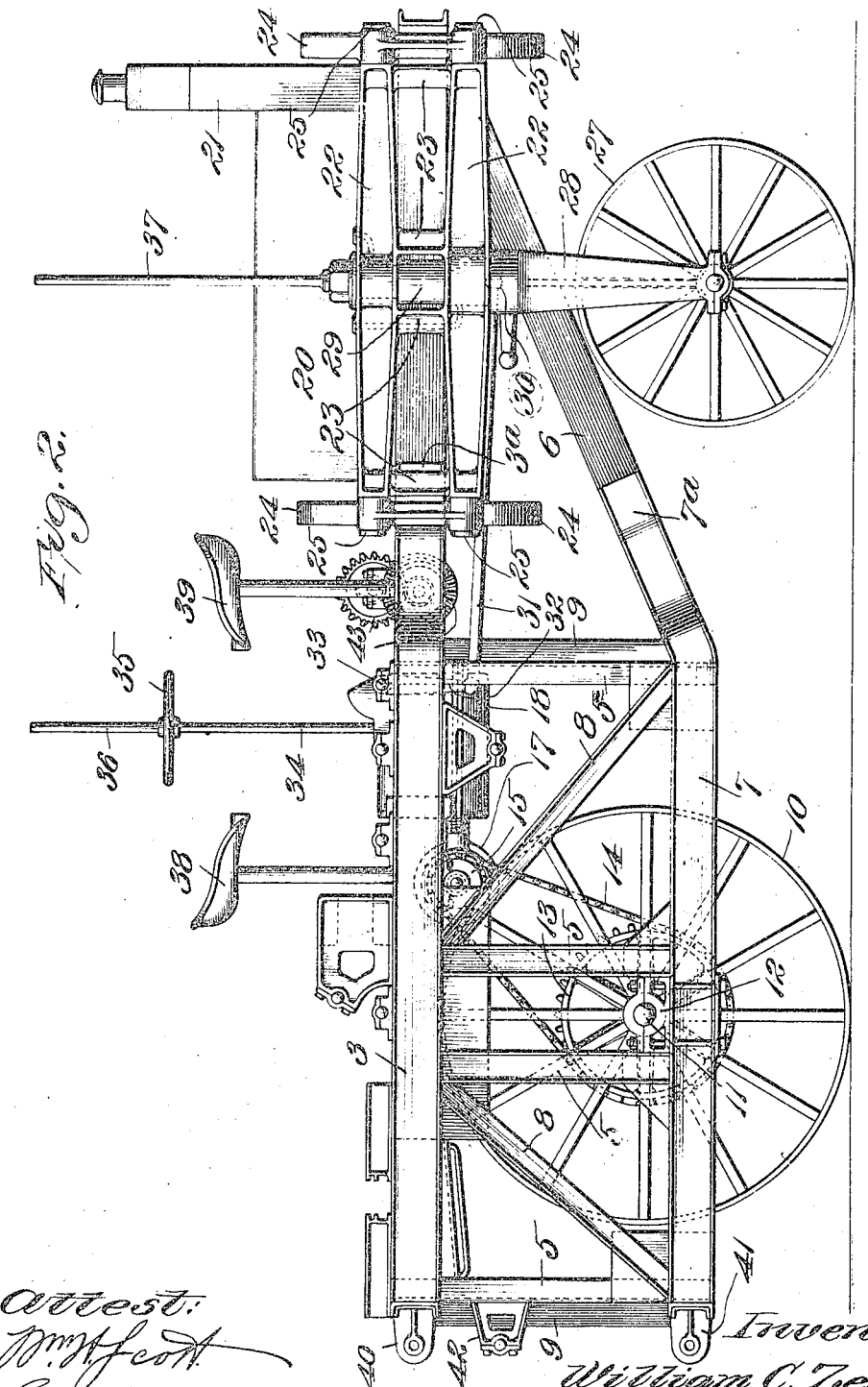

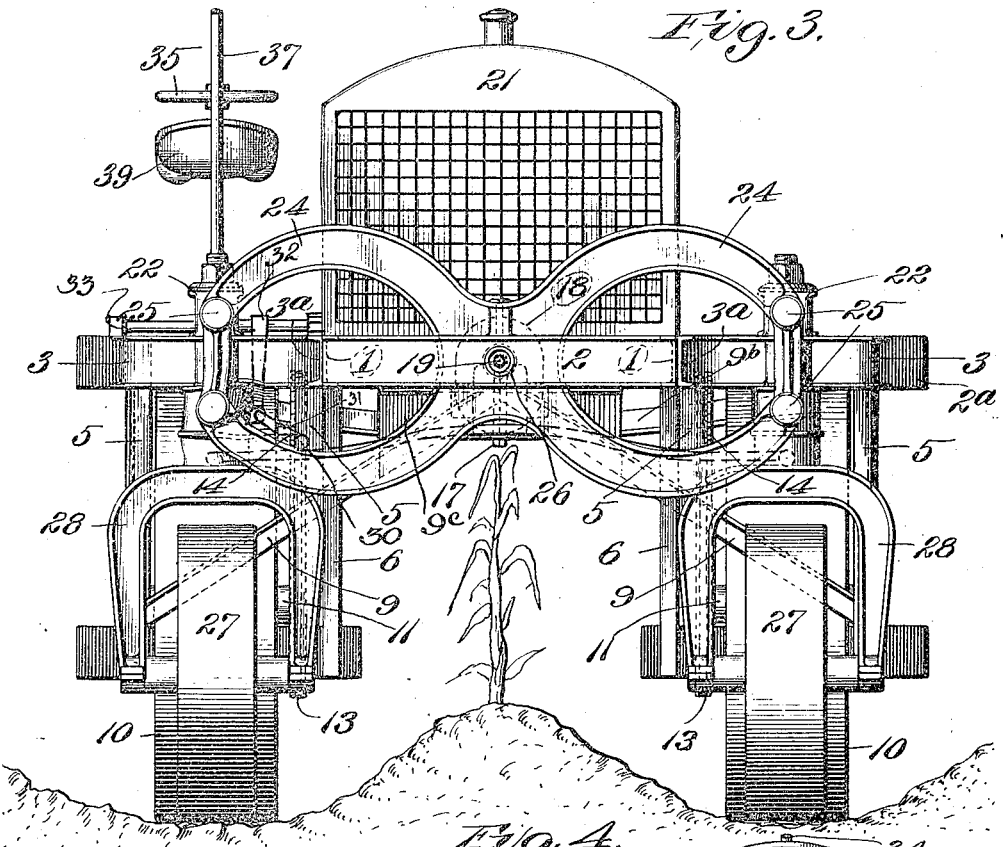
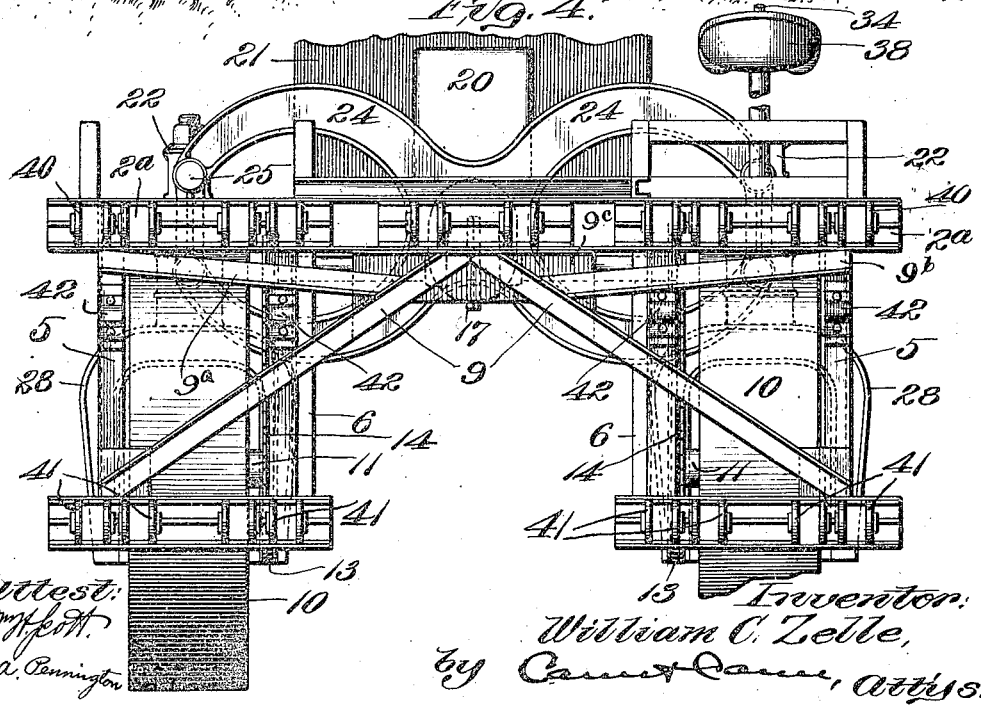

UNITED STATES PATENT OFFICE.

WILLIAM C. ZELLE, OF ST. LOUIS, MISSOURI, ASSIGNOR TO PLANTATION EQUIPMENT COMPANY, OF ST. LOUIS, MISSOURI, A CORPORATION OF MISSOURI.

TRACTOR.

1,130,863.    Specification of Letters Patent.    Patented Mar. 2, 1915.

Application filed April 1, 1912. Serial No. 687,929.

*To all whom it may concern:*

Be it known that I, WILLIAM C. ZELLE, a citizen of the United States, and a resident of the city of St. Louis and State of Missouri, have invented a new and useful Improvement in Tractors, of which the following is a specification.

This invention relates to tractors for farm and plantation work.

It has for its principal objects to produce a tractor adapted for general agricultural purposes, but more particularly for use in the cultivation of growing crops, such as sugar cane, corn and other plants that are arranged in rows and have to be cultivated after growing to a considerable height; to produce a straddle-row-structure giving a maximum clearance under the body frame without materially raising its center of gravity; to provide for the application and mounting of agricultural implements and attachments of various kinds interchangeably to and upon one and the same tractor; to secure stability of structure without undue weight; to secure a short wheel-base to make the machine as a whole flexible so that it will be able to pass over uneven ground without producing an excessive stress in any of its parts; and to attain certain other advantages as will hereinafter more fully appear.

The invention consists in the parts and in the arrangements and combinations of parts hereinafter described and claimed.

In the accompanying drawings which form part of this specification and wherein like symbols refer to like parts wherever they occur,—Figure 1 is a top plan of a tractor illustrating an embodiment of the invention; Fig. 2 is a side elevation; Fig. 3 is a front elevation; and Fig. 4 is a rear elevation, portions being broken away.

The tractor illustrated comprises longitudinal body or platform frame members 1 extending throughout the entire length of the machine and connected by a series of transverse members 2. At the front end of the machine and also some distance inwardly therefrom, the cross members 2 are arranged in two spaced pairs. The rear cross member is extended on opposite sides of the platform frame as at $2^a$. Longitudinal members 3 are secured at one end to the extensions $2^a$ and have their opposite end portions offset inwardly as at $3^a$, and secured to the longitudinal members 1. Short transverse members 4 connect the members 1 and 3 adjacent to the offset portions of the latter.

Depending from the longitudinal members 1 and members 3 are vertical members 5 which are secured at their lower ends to longitudinal members 6 and 7 corresponding respectively to the longitudinal members 1 and members 3. These side frame constructions constitute pedestals or supporting frames. The front end portions of the members 6 are turned up diagonally and secured to the platform members at the front end of the machine so as to brace the side pedestal frames and also to make clearance for the steering wheels to be presently described. The members 7 are offset inwardly and turned upwardly, as at $7^a$, and secured to the diagonal portions of the members 6. The pedestal frames are also braced by suitable side diagonal braces 8 and transverse diagonal braces 9. A truss $9^a$ is secured at the rear end of the frame members 1. This truss is formed by a single angle-iron brace $9^b$ having its ends secured to the frame members 1, and its medial portion fastened to a plate $9^c$ which is rigidly secured to the rear transverse member 2.

The traction wheels 10 are mounted within the pedestal frames on short axles 11 journaled in bearings 12 secured on the lower frame members 6 and 7. The shafts 11 have sprocket wheels 13 thereon which are driven by sprocket chains 14. The sprocket chains are in turn driven by sprocket wheels 15 on the ends of an ordinary divided driving shaft mounted in a tubular casing having a middle enlargement 17 containing the usual differential gear which connects and drives the two shaft sections as is obvious. The differential gear is connected, through the medium of suitable transmission gearing housed in a casing 18, to the propeller shaft 19 which is in turn connected in an obvious manner to the crank shaft of an ordinary internal combustion or other motor 20 mounted on the front portion of the platform frame. All of these power elements, as well as the radiator 21, may be of any obvious or desirable construction and arrangement. Therefore it is deemed unnecessary to illustrate or describe them in detail.

The front portion of the platform frame is mounted on an auxiliary carrier frame. The auxiliary carrier frame as shown comprises longitudinal side members 22 having horizontal upper and lower portions preferably cast integrally with vertical struts or connecting portions 23. The transverse members 24 of this frame are also preferably formed integrally. They are substantially S-shape and are bolted or otherwise rigidly secured to the ends of the side members 22, as at 25. The peculiar shape of the members 24 gives the required strength and rigidity to the structure, while the large openings allow it to oscillate about the centers or studs 26 when going over uneven ground without striking the longitudinal members 1 of the platform frame, and the narrow middle portion or waist provides the necessary clearance at the middle of the machine.

The auxiliary frame transverse members 24 are swiveled centrally on studs 26 mounted between the transverse members 2 of the respective spaced pairs at the front portion of the platform frame, the longitudinal side members 1 of the platform frame extending through the openings in said members 24. The studs 26 are made tubular and arranged in axial alinement with the crank shaft of the motor 20 and propeller shaft 19, so that either of said shafts may extend therethrough. This arrangement permits of an independent rocking movement of the auxiliary carrier frame with respect to the platform or main body frame without interfering with the operation of the shafts.

Steering wheels 27 are journaled in forked holders or yokes 28 having vertical shanks 29 centrally disposed above the wheels and swiveled in vertical bearings in the middle of the side members 22 of the auxiliary carrier frame. The shank of the steering-wheel-holder on one side of the machine is provided with a knuckle-bar 30 which is connected by a rod 31 to a knuckle-bar 32 on the shaft 33 of a suitable power mechanism having also as a part a vertical operating shaft 34 provided with a hand wheel 35. Preferably, the operating shaft 34 is on a line through the middle of the traction wheel and steering wheel on that side of the machine and it is provided with a vertical sighting rod 36 to be used in conjunction with a similar rod 37 extending up axially from the shank of the steering wheel, so that the tractor may be steered in a straight line across a field by keeping the sighting rods in line with a fixed mark somewhere upon or about the field.

A seat 38 is provided in convenient position at one side of the steering wheel for the driver when the machine is being propelled forward, and a similar seat 39 is provided oppositely to be used when the machine is propelled backward.

Controlling levers and devices have not been illustrated as the same may be of any obvious or desirable construction and arrangement and form no part of the present invention. So, too, it is deemed unnecessary to illustrate any of the attachments and implements to be carried or propelled by the tractor, as they may be of any desirable form such as disclosed in my application Serial No. 704,037, filed June 17, 1912. However, it is to be here noted that various implements and devices for breaking and tilling the soil, for the cultivation of growing crops, and for farm and plantation work in general, may be attached to or mounted upon the tractor interchangeably. For this purpose brackets 40 are provided at the rear of the platform, and similar brackets 41 on the lower rear portions of the pedestal frames. Bearings 42 may be provided at the rear of the machine for the mounting of rotatory shafts for driving certain power actuated devices which may be attached to the tractor.

The different attachments may be of any usual construction and arrangement or specially constructed and arranged for ready connection and interchange. The tractor may also be used as a carriage for the gathering and loading mechanism set forth in United States Letters Patent granted to me, Nos. 954,492 and 1,005,494. Any suitable power transmission mechanism 43 may be connected to the propeller shaft or motor at a point between the motor and the transmission gear 18 of the driving mechanism for the tractor, so that power attachments may be operated independently of said driving mechanism.

By the construction and arrangement of tractor herein set forth, the platform or main body frame can be mounted sufficiently high to give the required clearance in straddle-row cultivation without raising the center of gravity of the machine. So, too, as the frame structure obviates the necessity of using wheels of large diameter to secure the proper elevation of the platform, a short wheel base is obtained. Hence, the tractor can be turned in small space.

In the structure shown in the drawings the height of the center of gravity is above the ground about one-half the transverse distance across the machine between the treads of the wheels and about three-fourths the distance from the ground to the bottom of the platform frame. The preponderance of weight is considerably below the platform frame owing to the arrangement and weight of the side under framing and also the weight of the wheels. The only part of the machine projecting above the platform frame an appreciable distance is the motor whose weight is considerably less than the combined weight of the parts below the platform frame. Thus, for example, in cases where it is desirable to have the furrows six feet apart, the platform can have a clearance of four feet above the ground and the center of gravity will be about three feet thereabove.

Obviously, the tractor admits of considerable modification without departing from the invention. Therefore, I do not wish to be limited to the exact construction and arrangement shown.

What I claim is:

1. A tractor comprising a platform frame, two downwardly extending side frames secured to said platform frame near one end of each side thereof, an axle supported between the two side frames on each side of said platform frame, a traction wheel mounted on each of said axles, an auxiliary frame pivotally connected to said platform frame at a point between the sides of said platform frame near the other end thereof, said auxiliary frame being adapted to swing vertically, a steering wheel swiveled on said auxiliary frame near each side of said platform frame, said tractor having an unobstructed clearance between the underside of said platform frame and the underside of said auxiliary frame and the ground throughout the length of said tractor.

2. A tractor of the character described, comprising a platform frame provided near one end with depending side frames and having a clearance from the ground to its underside unobstructed throughout its length between said side frames, traction wheels mounted within and supporting said side frames, and an auxiliary carrier frame supporting the opposite end portion of said platform frame, said auxiliary carrier frame being supported on wheels at its sides and having a clearance under it the same as the platform frame, the clear undersides of said platform frame and auxiliary carrier frame being in a plane above the center of gravity of the entire machine.

3. A tractor comprising a platform frame having side extensions adjacent to one end, pedestal underframes supporting said side extensions of the platform frame, traction wheels mounted within said pedestal frames, an auxiliary carrier frame having a medial longitudinal swivel connection with the end portion of the platform frame opposite to the end which is adjacent to said pedestal frames, and steering wheels having holders swiveled vertically in said auxiliary carrier frame in line with said traction wheels.

4. A tractor comprising a platform frame, pedestal frames at the sides of said platform frame, said pedestal frames being braced longitudinally and laterally to the platform frame, axles mounted transversely on said pedestal frames, traction wheels mounted on said axles, an auxiliary carrier frame, a medial longitudinal swivel connection between said platform frame and said auxiliary carrier frame, and steering wheels having holders swiveled vertically in said carrier frame in line with said traction wheels.

5. A tractor comprising a platform having rigid pedestal side frames adjacent to one end, transverse shafts mounted on said pedestal frames, traction wheels mounted on said shafts within said pedestal frames, an auxiliary carrier frame having 8-shaped transverse members whose waist portions are swiveled medially to said platform, and steering wheels having a vertical swivel mounting in the side members of said auxiliary carrier frame.

6. A tractor comprising a main platform, said platform comprising longitudinal frame members and transverse frame members, and an auxiliary carrier frame comprising side members and transverse members, said transverse members of the auxiliary frame being substantially 8-shape, the waist portion of said members being pivoted medially to transverse frame members of the platform.

7. A tractor comprising a main platform, a traction running gear supporting one end portion thereof, a motor on the platform, power transmission mechanism between said motor and the traction wheels of the running gear, an auxiliary carrier frame comprising side members and transverse members, said transverse members having a medial longitudinal pivotal connection with the opposite end portion of said platform, and a steering running gear supporting the side members of said auxiliary carrier frame intermediate the ends thereof.

8. In a tractor, a platform frame comprising longitudinal side members extending the length thereof and transverse members connecting said longitudinal side members, said platform frame having lateral extensions adjacent to one end, comprising longitudinal outer members and transverse members connecting them with the longitudinal side members of the platform frame proper, one end of said outer members being turned inwardly and secured to said platform members, pedestal frames comprising vertical members secured at their upper ends to the respective longitudinal members of the platform frame proper and said lateral extensions, and at their lower ends to members corresponding to said upper longitudinal members, respectively, the lower longitudinal members under the longitudinal members of the platform frame proper being turned up diagonally and secured thereto.

9. A tractor comprising a frame, two longitudinal members rigidly connected to said frame, said longitudinal members being located near each side of said frame, and adjacent to the rear end thereof, a downwardly extending pedestal frame rigidly secured to said frame near each side thereof, a downwardly extending auxiliary pedestal frame rigidly secured to each of said longitudinal members, a traction wheel mounted between each pedestal frame and the corresponding auxiliary pedestal frame, and steering wheels supporting said frame near the front end thereof, said tractor having an unobstructed clearance between said pedestal frames below said frame to the ground.

10. In a tractor, a main frame having two downwardly extending pedestal frames secured to its rear, two auxiliary pedestal frames extending parallel with said pedestal frames, braces connecting each auxiliary pedestal frame to said main frame and to the corresponding pedestal frame, and a traction wheel mounted between each pedestal frame and the corresponding auxiliary pedestal frames, the space between said pedestal frames and below said main frame to the ground being unobstructed.

11. In a tractor, a main frame, downwardly extending braced pedestal frames secured to the rear part of said main frame, braces connecting said pedestal frames to said main frame, auxiliary pedestal frames extending parallel with said pedestal frames, braces connecting each auxiliary pedestal frame to said main frame, traction wheels mounted between each pedestal frame and the corresponding auxiliary pedestal frame, and an auxiliary frame having a high clearance at its middle and mounted to oscillate vertically on said main frame and steering wheels supporting said auxiliary frame.

12. A tractor comprising a main frame, traction wheels supporting said main frame, an auxiliary frame pivotally connected to said main frame to oscillate vertically, said auxiliary frame comprising two pairs of vertically spaced longitudinal side members and transverse members connected to the corresponding ends of said longitudinal side members, said transverse members having substantially the shape of a figure 8, and a steering-wheel holder swiveled vertically in each pair of said longitudinal side members.

13. In a tractor, a main frame, traction wheels mounted on said main frame, an auxiliary frame comprising a pair of transverse members, steering wheels swiveled on said auxiliary frame, two spaced pairs of cross members secured to said main frame, and means for pivotally connecting each transverse member of said auxiliary frame to each pair of said cross members of said main frame, said means being in the longitudinal median line of said main frame.

14. In a tractor, a main frame, traction wheels mounted on said main frame, an auxiliary frame comprising a pair of transverse members and a pair of longitudinal members, caster wheels mounted on said longitudinal members, and studs pivotally connecting said transverse members with said main frame along the longitudinal median line of said main frame.

15. In a tractor, a main frame comprising a pair of longitudinal members and spaced pairs of cross members, an auxiliary frame, steering wheels swiveled on said auxiliary frame, said auxiliary frame comprising two spaced transverse members each pivoted between a pair of said cross members at the longitudinal center of said beams, said spaced members having arms spaced apart to provide clearance for said longitudinal members and permit said auxiliary frame to oscillate.

16. In a tractor, a main frame comprising longitudinal members, an auxiliary frame pivoted to said main frame on a horizontal axis extending along the longitudinal median line of said main frame, said auxiliary frame having arms curved to clear said longitudinal members during the oscillation of said auxiliary frame.

17. A tractor comprising a main frame comprising two longitudinal body members and two pairs of transverse members, an auxiliary frame having two vertically spaced longitudinal side members located adjacent to each of said longitudinal body members, a steering-wheel holder swiveled vertically in said longitudinal side members near each side of said main frame, transverse members connected to the corresponding ends of said longitudinal side members, said last-mentioned transverse members having arms straddling said longitudinal body members, and means pivotally connecting said last-mentioned transverse members and said first-mentioned transverse members on a horizontal axis extending along the longitudinal median line of said main frame, each of said last-mentioned transverse members lying between a pair of said first-mentioned transverse members.

18. In a tractor, a platform frame, two downwardly extending pedestal frames secured to said platform frame near one end of each side thereof, a traction wheel mounted on a short axle between the two pedestal frames on each side of said platform frame, brackets secured to the rear end of said frame, and other brackets secured to said pedestal frames below the axis of said traction wheels, said brackets being adapted to transmit the force of the draft of said tractor.

Signed at St. Louis, Missouri, this 27th day of March, 1912.

WILLIAM C. ZELLE.

Witnesses:
G. A. PENNINGTON,
PAULINE AMBERG.